United States Patent
Spedding et al.

[11] Patent Number: 5,847,886
[45] Date of Patent: Dec. 8, 1998

[54] LENS MOUNTING COMPRISING AT LEAST THREE CIRCUMFERENTIALLY SPACED BEARINGS

[75] Inventors: Paul Spedding; George Hood, both of Wales, United Kingdom

[73] Assignee: Pilkington P.E. Limited, Wales, United Kingdom

[21] Appl. No.: 850,712

[22] Filed: May 2, 1997

[30] Foreign Application Priority Data

May 3, 1996 [GB] United Kingdom .................... 9609367

[51] Int. Cl.⁶ .................................................... G02B 7/02
[52] U.S. Cl. ............................................. 359/819; 359/823
[58] Field of Search .................... 359/819, 811, 359/821, 822, 694, 823

[56] References Cited

U.S. PATENT DOCUMENTS

| 4,514,039 | 4/1985 | Kawai ...................................... 359/694 |
| 4,812,015 | 3/1989 | Iizuka et al. ............................. 359/819 |
| 4,961,627 | 10/1990 | Swain et al. ............................. 359/819 |
| 5,162,948 | 11/1992 | Horning et al. ......................... 359/694 |
| 5,424,872 | 6/1995 | Lecuyer et al. .......................... 359/811 |
| 5,502,598 | 3/1996 | Kimura et al. .......................... 359/814 |

FOREIGN PATENT DOCUMENTS

| 0 620 463 | 10/1994 | European Pat. Off. . |
| 1 120 236 | 12/1961 | Germany . |
| 909336 | 10/1962 | United Kingdom . |
| 1047320 | 11/1966 | United Kingdom . |
| 1108244 | 4/1968 | United Kingdom . |
| 2 238 883 | 6/1991 | United Kingdom . |
| 2 244 534 | 12/1991 | United Kingdom . |

*Primary Examiner*—Georgia Epps
*Assistant Examiner*—Ricky Mack
*Attorney, Agent, or Firm*—Bell Seltzer Intellectual Property Law Group of Alston & Bird LLP

[57] ABSTRACT

An arrangement (10) for mounting a lens for axial movement comprises a housing (12) defining an axially extending bearing surface (14) and a lens carriage (16) including least three circumferentially spaced bearings (20, 21, 22) in contact with the bearing surface (14) and permitting axial movement of the carriage (16) relative to the housing (12). One of the bearings (20) is biassed towards the bearing surface (14). In use, the arrangement (10) maintains a three-point contact between the lens carriage (16) and the bearing surface (14) despite geometrical variations in the surface.

14 Claims, 1 Drawing Sheet

LENS MOUNTING COMPRISING AT LEAST THREE CIRCUMFERENTIALLY SPACED BEARINGS

FIELD OF THE INVENTION

This invention relates to a lens mounting, and in particular to an arrangement for mounting a lens for axial movement.

BACKGROUND OF THE INVENTION

It is known to provide arrangements in which a lens is mounted for axial and rotational movement using rubbing (dry bearing) cylinders with close tolerance control to minimise play. The need for such close tolerance control increases the cost of producing such arrangements and renders the arrangements susceptible to effects such as thermal expansion, manufacturing variability and distortion in use.

It is among the objects of embodiments of the present invention to provide lens mounting arrangements which is obviate or mitigate these disadvantages.

SUMMARY OF THE INVENTION

According to the present invention there is provided an arrangement for mounting a lens for axial movement, the arrangement comprising:

a housing defining an axially extending bearing surface; and a member for mounting a lens and including at least three circumferentially spaced bearings in contact with the bearing surface and permitting axial movement of the member relative to the housing, at least one of the bearings being biassed towards the bearing surface.

In use, the arrangement maintains a three-point contact between the lens mounting member and the bearing surface despite geometrical variations in the bearing surface, and thus obviates the requirement for the close tolerance control which is necessary in existing arrangements.

The lens mounting member may be located externally of the housing bearing surface, however the mounting member is preferably located internally of the surface. Accordingly, the biassed bearing is biassed to increase the diameter of the contact points defined by the bearings.

The bearings may provide a rolling or sliding contact with the bearing surface.

Preferably, the biassed bearing is biassed tangentially relative to the circumference escribed by the bearing contact points. In the preferred embodiment, the bearings are roller bearings mounted on roller support shafts and the biassed bearing includes a spring acting tangentially to bias the bearing along the respective support shaft. Most preferably, the spring acts on the inner race of the roller.

Preferably also, the three bearings are spaced 120°.

Preferably also, the bearing surface is at least part cylindrical, permitting rotation of the lens mounting member. Alternatively, the bearing surface may only define three axially extending strips, where there is no requirement for the mounting member to rotate.

Preferably also, the lens mounting member includes a further set of bearings in sliding contact with the bearing surface at a location axially spaced from the first set of bearings. Dependant on the location of the lens and the distance between the sets of bearings, low tolerance plain bearings may be sufficient for the second set, or the second set of bearings may be similar to the first set.

According to another aspect of the present invention there is provided an arrangement for mounting a lens for axial movement, the arrangement comprising:

a housing; and a member for mounting a lens, one of the housing and the member defining an axially extending bearing surface and the other of the housing and the member including at least three circumferentially spaced bearings in contact with the bearing surface and permitting axial movement of the member relative to the housing, at least one of the bearings being biassed towards the bearing surface.

BRIEF DESCRIPTION OF THE DRAWINGS

These and other aspects of the present invention will now be described, by way of example, with reference to the accompanying drawings, in which.

DETAILED DESCRIPTION OF THE DRAWINGS

Figure 1:
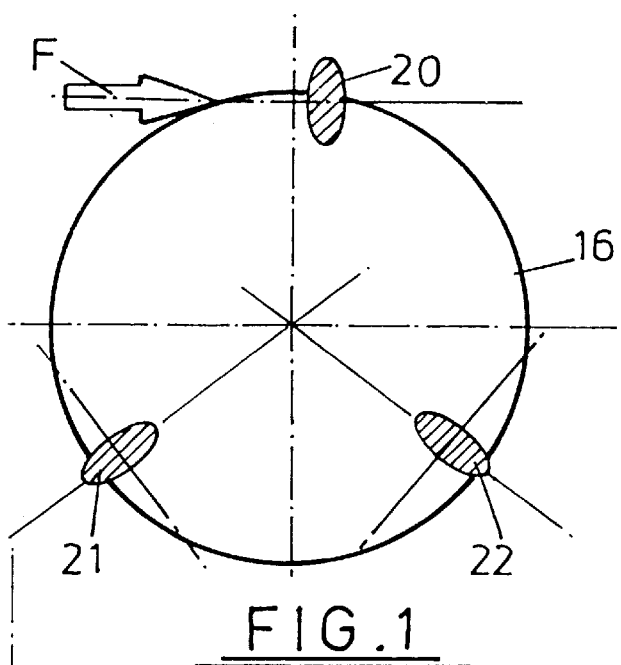
FIG. 1 is a schematic end view of the lens mounting of an arrangement in accordance with a preferred embodiment of the present invention.
Figure 2:
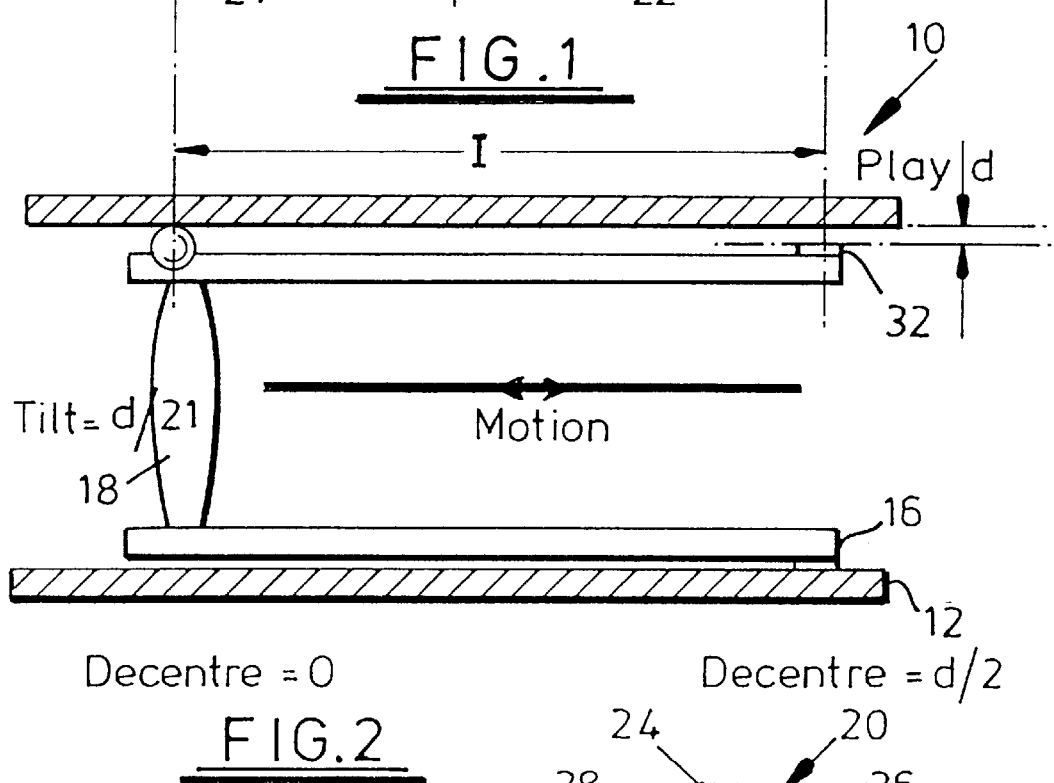
FIG. 2 is a schematic sectional side view of a lens mounting arrangement in accordance with a preferred embodiment of the present invention.

Reference is first made to FIGS. 1 and 2 of the drawings which illustrate a lens mounting arrangement 10 in accordance with a preferred embodiment of the present invention. The arrangement 10 comprises a housing 12 defining a cylindrical bearing surface 14 and a lens carriage 16 providing mounting for a lens 18 and including three roller bearings 20, 21, 22 in rolling contact with the bearing surface 14.

Figure 3:
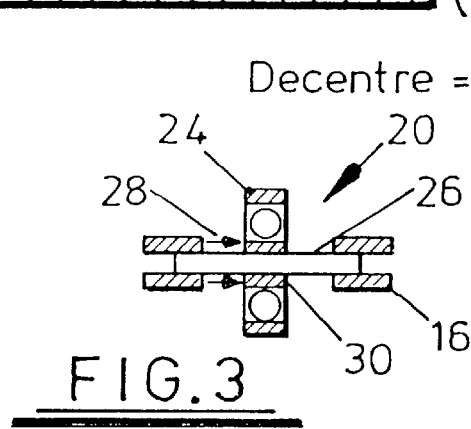
FIG. 3 is a schematic enlarged view of a roller bearing of the arrangement of FIG. 2.

Reference is now also made to FIG. 3 of the drawings which illustrates a bearing 20 comprising a roller 24 mounted on a shaft 26 fixed to the carriage 16. As may be seen from FIG. 1, the rollers of two of the bearings 21, 22 are aligned with radii of the circular lens carriage 16, however the roller of one of the bearings 20 is normally tangentially spaced from the respective radius, being biassed towards this position by a spring, represented by arrows 28 in FIG. 3, located around the shaft 26 and bearing against the inner race 30 of the bearing. Thus, the bearing 20 is biassed to increase the diameter of the contact points defined by the bearings 20, 21, 22.

As may be seen from FIG. 2, the first set of bearings 20, 21, 22 are provided at one end of the lens carriage 16, adjacent the lens 18, while a second bearing set 32 is provided at the other end of the carriage 16. In this embodiment the second bearing set is in the form of a low tolerance plain bearing surface 32. Such a bearing 32 provides a degree of play (d) resulting in a degree of tilt dependent upon the play (d) and the overall length (l) between the bearing sets. In other embodiments, which will not tolerate tilt, a second set of bearings similar to the first bearings 20, 21, 22 may be utilised.

To locate the carriage 16 within the housing 12, the sprung roller bearing 20 is pushed against the spring 28 reducing the described diameter. Once the carriage 16 is located within the housing 12 the roller bearing 20 is released and is pushed in the direction of applied spring force (F) to provide three point contact with the bearing surface 14, which contact is maintained despite variations in the cylinder 14 that may occur due to, for example, thermal expansion, distortion in use and manufacturing variability.

It will be clear to those of skill in the art that the above described embodiment is merely exemplary of the present invention, and that various modifications and improvements may be made thereto, without departing from the scope of the invention. In the above described embodiment the bearing 20 is spring biassed tangentially relative to the carriage 16, and a similar effect could be achieved by spring loading the roller radially. However, this necessitates a large volume to incorporate a coil spring or a more complex mounting method if leaf springs are employed.

We claim:

1. An arrangement for mounting a lens for axial movement, the arrangement comprising:

a housing having an axis and defining an axially extending surface extending parallel to said axis; and a member for mounting a lens and comprising at least three circumferentially spaced bearings in contact with the surface and permitting axial movement of the member relative to the housing along said surface and parallel to said axis, at least one of the bearings being biassed towards the surface.

2. The arrangement of claim 1, wherein the mounting member is located internally of the surface and the biassed bearing is biassed radially outward towards the surface.

3. The arrangement of claim 1, wherein the bearings provide a rolling contact with the surface.

4. The arrangement of claim 1, wherein the biassed bearing is biassed tangentially relative to a circumference described by contact points defined by the bearings.

5. The arrangement of claim 4, wherein the bearings are roller bearings mounted on roller support shafts and the biassed bearing includes a spring acting tangentially to bias the bearing along the respective support shaft.

6. The arrangement of claim 5, wherein the spring acts on an inner race of the roller.

7. The arrangement of claim 1, wherein the three bearings are at 120° spacings.

8. The arrangement of claim 1, wherein the surface is at least part cylindrical, permitting rotation of the lens mounting member.

9. The arrangement of claim 1, wherein the lens mounting member includes a further set of bearings in contact with the surface at a location axially spaced from said at least three circumferentially spaced bearings.

10. An arrangement for mounting a lens for axial movement, the arrangement comprising:

a housing defining an axis; and a member for mounting a lens, one of the housing and the member defining a surface extending parallel to said axis and the other of the housing and the member including at least three circumferentially spaced bearings in contact with the surface and permitting movement of the member relative to the housing along said surface and parallel to said axis, at least one of the bearings being biassed towards the surface.

11. A lens mounting arrangement comprising:

a housing defining an axially extending surface; and a lens carriage having three circumferentially spaced bearings in contact with the surface and permitting axial movement of the carriage relative to the housing; the bearings defining three contact points and one of the bearings being biassed tangentially relative to a circumference described by said contact points towards the surface.

12. The arrangement of claim 11, wherein the surface is cylindrical and the lens carriage is rotatable relative to the housing.

13. The arrangement of claim 11, wherein the lens carriage comprises a further set of bearings in contact with the surface at a location axially spaced from said three circumferentially spaced bearings.

14. An arrangement for mounting lens for axial movement, the arrangement comprising:

a housing having an axis and defining a surface extending parallel to said axis; and a member for mounting a lens and the member comprising at least three circumferentially spaced bearings in contact with the surface and permitting movement of the member relative to the housing along said surface and parallel to said axis and means for biassing at least one of the bearings towards the surface.

* * * * *